(No Model.)
A. B. PARVIN.
PHOTOGRAPHIC OBJECTIVE.
No. 492,335. Patented Feb. 21, 1893.
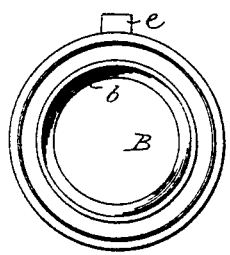
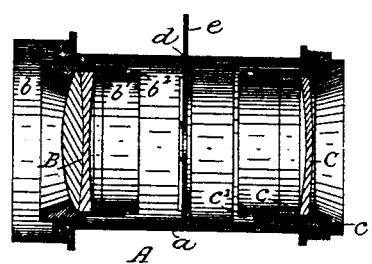
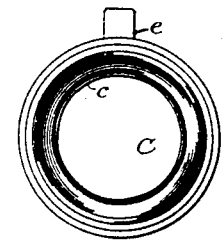
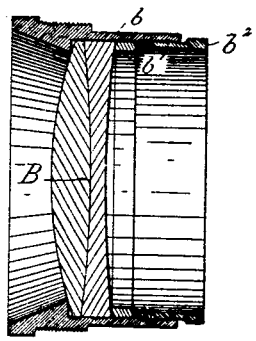
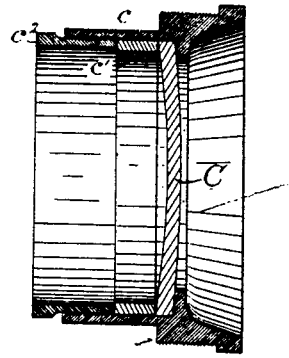
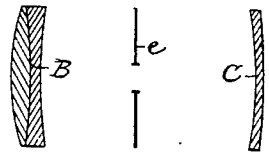
WITNESSES:
Thomas M. Smith.
Richard B. Maxwell
INVENTOR.
Albert B. Parvin,
BY J. Walter Douglass,
ATT'Y.

UNITED STATES PATENT OFFICE.

ALBERT B. PARVIN, OF PHILADELPHIA, PENNSYLVANIA, ASSIGNOR TO KATIE V. PARVIN, OF SAME PLACE.

PHOTOGRAPHIC OBJECTIVE.

SPECIFICATION forming part of Letters Patent No. 492,335, dated February 21, 1893.

Application filed September 3, 1892. Serial No. 444,982. (No model.)

*To all whom it may concern:*

Be it known that I, ALBERT B. PARVIN, a citizen of the United States, residing at the city of Philadelphia, in the county of Philadelphia and State of Pennsylvania, have invented certain new and useful Improvements in Photographic Objectives, of which the following is a specification.

My invention relates to photographic objectives adapted to magnify the image of an object or objects at great distance, range, length or position from the camera and with marked sharpness in detail.

It is generally understood by those skilled in photography that the size of the image of an object upon the ground glass of a camera depends upon one of three conditions, first the focal length of the objective; second, the distance of the same from the object to be photographed; and third, upon the size of the original. Two of these conditions under certain circumstances are subject to variation, that is, the distance from the object and the focus of the lens. Of course, if the object to be photographed can be approached or lenses of different focal power are at hand, then an image of the required size can be obtained, but such favorable conditions do not exist in every day practice of the photographer. The required approach to the desired object is often impossible or impracticable, because the required distance is too great to afford recognizable detail in the resultant negative, requiring lenses of extreme long focus, which necessarily are rather circumscribed. Suppose for instance a photograph is required of an inscription upon a rock about three hundred feet high, to obtain a fair view without distortion, the operative would have to locate about seven hundred feet from the rock and this would bring the inscription about eight hundred feet in a direct line from the lens. To secure distinctness or sharpness as to detail the letters of the inscription would have to appear at least four inches high on the object in the resultant picture. To attain such a result say with a lens of five by six meters focus, would require a camera with about an eighteen foot extension. Then again small images with subsequent enlargement suffer from the disadvantage of the grain of the plate for even by slight enlargement such is apt to become so objectionably prominent as to destroy all detail. The efforts to overcome such difficulty in exposures has suggested the use of a telescope, as a substitute for a photographic objective, but such in practice was found to be awkward and unstable; and moreover, with the use of the firmest tripod, the slightest breath of air or the least tremor was calculated to spoil the image of the object.

The principal objects of my invention are first, to overcome the above mentioned disadvantages and objectionable features and to provide a photographic objective of comparatively simple construction and effective action for enlarging the image of an object or objects at equal or unequal distances from each other with respect to the position of the camera; second, to provide a photographic objective having a non-extensible tube provided with a single negative lens ground according to a mathematical formula to certain radii to a compound positive lens ground according to a mathematical formula to different radii, and the construction and arrangement being such that the image of an object or objects at distant points or positions from each other are appreciably enlarged or magnified with marked sharpness of detail in the resultant negative or sensitive film or plate; third, to provide a photographic objective with a non-extensible lens tube having a slit formed in the wall thereof for the reception of a perforated slide or diaphragm for correcting marginal rays and with a compound convergent positive lens and a single divergent negative lens; fourth, to provide a photographic objective with a non-extensible tube having a convergent compound lens and a divergent single lens, respectively ground to different radii, and the length of the lens tube being proportionate to the diameters of the lenses, whereby increased magnification and sharpness of detail of the image of the distant object with respect to its real location and position are obtained; fifth, to provide a photographic objective with a tube having a double front lens of certain radii and a single back lens of different radii; sixth, to provide a photographic objective with a single divergent lens having each face or surface thereof of different radii; seventh, to provide a photographic objective with a convergent positive lens and with a negative divergent lens having different radii in respect to the sides or surfaces thereof; eighth, to provide a lens tube having two lenses, the radii of each of which have a fixed relation with respect to the length of the tube; ninth, to provide a photographic objective having a non-extensible tube with a concavo-convex lens of certain radii of inside curves and of certain radii of outside curves, to afford certain focal length and a convexo-concavo lens of certain radii adapted to enlarge and to define with decided sharpness of detail the image of a distant object transferred to a film or plate; and tenth, to provide a photographic objective adapted to an ordinary camera and comprising a non-extensible tube provided with a convergent compound or double lens and a divergent single lens and the radii of said lenses with respect to each other being different on the respective faces or surfaces thereof, in order to give by the combination greatly increased magnification or enlargement and great depth of focus.

My invention consists of a photographic objective comprising a tube having a compound convergent lens and a single divergent lens suitably mounted therein.

My invention further consists of a photographic objective comprising a non-extensible tube with convergent and divergent different radii lenses mounted therein.

My invention further consists of a photographic objective comprising a non-extensible tube provided with a double or compound convergent lens and with a single divergent lens and respectively of different radii.

My invention further consists of a photographic objective having convergent and divergent lenses of respectively different radii as to inside and outside curves, faces or surfaces thereof, and adapted to greatly magnify or enlarge the image of distant objects with sharpness of detail.

My invention further consists of a photographic objective, comprising a non-extensible tube having a fixed relation to a compound lens of certain radii and to a single lens of two different radii, the construction and arrangement thereof being such, that the image of a distant object is greatly magnified and sharply defined, so that the different positions of the objects are brought onto a film or plate with characteristic sharpness and clearness of detail.

My invention further consists of a photographic objective comprising a small tube provided with a compound lens of certain or fixed radii of inside and outside faces, curves or surfaces and with a single lens of different radii of inside and outside faces, curves or surfaces and the lenses respectively having convergent and divergent properties in order to give great depth of focus and permit the image of distant objects to be transferred in magnified form to a photographic film or plate with characteristic sharpness as to detail and with remarkable clearness or distinctiveness of field.

My invention further consists of a photographic objective provided with a non-extensible tube having convergent and divergent lenses of certain or defined radii with respect to each other and the length of the tube and susceptible of being increased or decreased in length proportionately as the diameters of the respective lenses are increased or diminished; and my invention further consists of the improvements in photographic objectives hereinafter described and claimed.

The nature and general characteristic features of my invention will be more fully understood by reference to the accompanying drawings forming part hereof; and in which Figure 1, is a longitudinal central section through the photographic objective, showing a non-extensible tube provided with a detachable perforated diaphragm or slide adapted to correct marginal rays and with a concavo-convex positive lens and with a convexo-concave negative lens, the latter embodying in conjunction with the non-extensible tube the main features of my invention. Fig. 2, is an elevational view of the front of a photographic objective. Fig. 3, is a similar view of the rear end of a photographic objective with a lens of my invention shown in application thereto, and also showing the arm of the detachable perforated diaphragm connected with the non-extensible lens tube. Figs. 4 and 5, are respectively enlarged central sectional views of the positive and negative lenses in their respective mountings with the barrel of the non-extensible or expansible tube removed; and Fig. 6, is a sectional view, showing in detail and removed from the tube, the compound convergent positive lens, and the divergent negative lens of my invention; and these lenses according to a mathematical formula ground respectively to different radii on their inside and outside curves, surfaces or faces, in order to adapt the same in conjunction with the non-extensible tube of Fig. 1 of a certain length in proportion to the diameters of the respective lenses, to give great depth of focus and enlargement of the image of distant objects with characteristic sharpness in the transfer to a photograph film or plate.

Referring to the drawings A, is a brass or other tube provided with a barrel $a$, and with detachable threaded coupling rings and sleeves $b$, $b'$, $b^2$, $c$, $c'$ and $c^2$ for supporting in proper position in the barrel $a$, the respective lenses B and C. About midway of the barrel of the tube A, and between the lenses B and C, is provided a slit $d$, adapted for the insertion of a detachable perforated diaphragm or slide $e$, for correcting marginal rays.

The tube A, is provided in the front extremity thereof, with a compound lens B, ground according to a mathematical formula with respect to the inside and outside curves, faces or surfaces thereof, to certain radii and at the rear extremity of the barrel of the tube A, is mounted a single lens C, ground according to a mathematical formula as to inside and outside curves, surfaces or faces, to different radii.

The tube A, with the lenses B and C, constitutes what is generally known as a "photographic objective."

The tube A, for a five by seven or five by eight plate or sensitized film may be about two and one quarter inches in length to lenses each about one and one quarter inches diameter. It should be borne in mind, however, that as the tube is increased or diminished in length so proportionately the diameters of the lenses will be increased or diminished. With respect to the lenses, it may be remarked, that the feature of this invention is to provide a single lens ground according to a mathematical formula on the inside and outside curves, faces or surfaces to certain radii and of a compound lens of certain other radii, as to the inside and outside curves, faces or surfaces thereof. Moreover, these lenses B and C mounted in the tube A, have respectively convergent and divergent proclivities and are adapted to give greatly enlarged image of the distant object, that is to say, to the extent of ten, twenty and even a hundredfold without impairing in the least any of the characteristic sharpness of detail embraced within the field of the objective. Moreover, the image of the distant objects transferred to the sensitized film or plate and also in the resultant picture according to my invention, is much more pronounced than heretofore was possible by the use of any of the commercial camera objectives.

The negative single lens C, mounted in the tube A, is ground on the faces or surfaces thereof, to different radii and is used in connection with the compound or double positive lens ground to different radii, in lieu of the generally employed compound lenses for such purposes. Furthermore, the positive lens is a convergent one, while the negative is a divergent lens.

By providing the non-extensible tube A, with respectively convergent and divergent lenses, it has been found that great depth of focus is obtained, as well as magnification or enlargement of the image of distant objects, without in the least losing any of the characteristic detail required.

In order that my invention may be fully understood by those skilled in optics and in the art of photography, the relation which the back lens C bears to the front lens B, will now be given.

The front compound lens comprises preferably a double convex lens ground respectively to the radii of two and one-eighth and one and seven-eighths inches, more or less, to outside curve, face or surface thereof, and with a double concave lens ground respectively to the radii of one and seven-eighths and thirty-one inches, more or less, to inside curve, face or surface, and as so combined such combination lens has a focal length of six and one-fourth inches, more or less. The back or single lens may be a convexo-concave or periscopic lens ground to the radii of twenty-five and one-half inches, more or less, to the outside face or surface thereof and ground to the radii of four and three-fourths inches, more or less, to the inside face or surface and this lens has a focal length of five and three-fourths inches, more or less.

The above combination of lenses mounted in the tube A, having a length of about two and one-fourth inches, may be applied to any ordinary commercial camera and will give a depth of focus of about twenty inches, more or less.

In the practice of my invention with a photographic objective constructed as described, images of objects have been taken at six thousand six hundred feet to two miles distant from the camera with greater sharpness of detail in the prints than ordinarily can be obtained in prints taken at one hundred feet distant from the camera.

The foregoing advantageous features of my invention are due to the character of lenses employed in the non-extensible tube and to the depth of focus obtained from the use thereof.

In the practice of my invention neither spherical aberration nor astigmatism is present, so that the objective is achromatic.

Having thus described the nature and objects of my invention, what I claim as new, and desire to secure by Letters Patent, is—

1. A photographic objective comprising a tube provided with a compound convergent front lens and a single divergent rear lens, the construction being such that great depth of focus is obtained and enlargement of the image of a distant object insured in its transfer onto a sensitized film or plate, substantially as described.

2. A photographic objective comprising a non-extensible tube provided with a compound front lens and a single rear lens of different radii with respect to each other, substantially as and for the purposes described.

3. A photographic objective comprising a non-extensible tube provided with a detachable diaphragm or slide, a compound front lens of certain radii and a single rear lens of different radii, substantially as and for the purposes described.

4. A photographic objective comprising a non-extensible tube provided with a removable perforated slide or diaphragm, a compound convergent front lens and a single divergent rear lens of different radii in respect to the faces or surfaces and of different focal length, whereby great magnification or enlargement of the image of a distant object is insured with characteristic sharpness of detail, substantially as described.

5. A photographic objective comprising a non-extensible tube provided with a detachable perforated slide or diaphragm, a single convexo-concave rear lens of certain radii as to inside and outside faces or surfaces and a compound front lens of certain radii as to inside and outside faces or surfaces, substantially as and for the purposes described.

6. A photographic objective comprising a non-extensible tube provided with a compound front convergent lens and a single divergent lens respectively of different focal length, substantially as and for the purposes set forth.

7. A photographic objective comprising a non-extensible tube with a detachable perforated diaphragm, a compound front lens and a periscopic rear lens, substantially as and for the purposes described.

8. A photographic objective comprising a non-extensible tube provided with a compound front lens of certain radii and a single rear lens of certain radii and the length of the tube being proportional to the diameters of the respective lenses, substantially as and for the purposes described.

9. A photographic objective comprising a non-extensible tube provided with a compound concavo-convex convergent front lens, and a single convexo-concave divergent rear lens, substantially as and for the purposes set forth.

10. A photographic objective comprising a non-extensible tube having a compound front convex-concavo lens and a single periscopic rear lens, the arrangement being such that great depth of focus is obtained and the transfer of the image of distant objects embraced within the field to a sensitized film or plate is insured with great magnification and with characteristic sharpness of detail, substantially as described.

In testimony whereof I have hereunto set my signature in the presence of two subscribing witnesses.

ALBERT B. PARVIN.

Witnesses:
 THOMAS M. SMITH,
 RICHARD C. MAXWELL.